(12) United States Patent
Perlin et al.

(10) Patent No.: US 8,712,112 B2
(45) Date of Patent: Apr. 29, 2014

(54) DOT TEMPLATES FOR OBJECT DETECTION IN IMAGES

(71) Applicant: Quantum Signal, LLC, Saline, MI (US)

(72) Inventors: Victor E. Perlin, Ann Arbor, MI (US); Mitchell M. Rohde, Saline, MI (US); Robert M. Lupa, Mt. Vernon, IL (US)

(73) Assignee: Quantum Signal, LLC, Saline, MI (US)

( * ) Notice: Subject to any disclaimer, the term of this patent is extended or adjusted under 35 U.S.C. 154(b) by 0 days.

(21) Appl. No.: 13/709,272

(22) Filed: Dec. 10, 2012

(65) Prior Publication Data

US 2013/0094757 A1    Apr. 18, 2013

Related U.S. Application Data

(60) Division of application No. 13/048,393, filed on Mar. 15, 2011, now Pat. No. 8,351,663, which is a continuation of application No. 12/605,120, filed on Oct. 23, 2009, now Pat. No. 7,929,735, which is a continuation of application No. 11/286,457, filed on Nov. 25, 2005, now Pat. No. 7,627,149.

(51) Int. Cl.
| | |
|---|---|
| *G06K 9/00* | (2006.01) |
| *G06K 9/68* | (2006.01) |
| *G06K 9/62* | (2006.01) |
| *G06T 7/00* | (2006.01) |

(52) U.S. Cl.
CPC ............ *G06K 9/6211* (2013.01); *G06T 7/0044* (2013.01); *G06K 9/00248* (2013.01); *G06T 2207/30201* (2013.01)
USPC .......................................... 382/118; 382/218

(58) Field of Classification Search
USPC .......................... 382/115–118, 190, 209, 224
See application file for complete search history.

(56) References Cited

U.S. PATENT DOCUMENTS

| | | | | |
|---|---|---|---|---|
| 5,982,912 A | * | 11/1999 | Fukui et al. | 382/118 |
| 6,044,168 A | * | 3/2000 | Tuceryan et al. | 382/118 |
| 7,627,149 B2 | * | 12/2009 | Perlin et al. | 382/118 |
| 7,929,735 B2 | * | 4/2011 | Perlin et al. | 382/118 |
| 2003/0198366 A1 | * | 10/2003 | Fukui et al. | 382/118 |

OTHER PUBLICATIONS

Ç eliktutan, Oya, Sezer Ulukaya, and Bülent Sankur. "A Comparative Study of Face Landmarking Techniques." EURASIP Journal on Image and Video Processing 2013.1 (2013): 13.*

* cited by examiner

*Primary Examiner* — Randolph I Chu
*Assistant Examiner* — Nathan Bloom
(74) *Attorney, Agent, or Firm* — Michael Dryja

(57) ABSTRACT

Dot templates are used for detecting objects within images. A computer-implemented method is performed for each of a number of dot templates corresponding to the object to be detected within an image. Each dot template is defined as a collection of points. At each position within the image, a value of the image is determined at each point of the dot template. The dot template is effectively overlaid at the given position within the image. A score of the dot template at this position is determined, based on the values of the image determined at the points of the dot template. Where the score is greater than a predetermined threshold, it can be concluded that the object is at least potentially located within the image at the position in question at which the dot template has been effectively overlaid.

10 Claims, 7 Drawing Sheets

DOT TEMPLATES FOR OBJECT DETECTION IN IMAGES

RELATED APPLICATIONS

The present patent application is a divisional of the previously filed and present pending patent application assigned Ser. No. 13/048,393, which is a continuation of the previously filed and presently pending patent application entitled "Dot Templates for Object Detection in Images," filed on Oct. 23, 2009, and assigned Ser. No. 12/605,120, which is a continuation of the previously filed patent application entitled "Dot Templates for Object Detection in Images," filed on Nov. 25, 2005, and assigned Ser. No. 11/286,457.

FIELD OF THE INVENTION

The present invention relates generally to the detection of objects within images, and more particularly to the utilization of dot templates to detect objects within images.

BACKGROUND OF THE INVENTION

Computerized object detection involves detecting or identifying objects within digital images. An image is typically represented as a number of pixels, usually organized as a grid, where each pixel has a different value. In the case of a black-and-white image, each pixel of the image may have a single value, substantially corresponding to the intensity or brightness of the pixel within the image. In the case of a color image, each pixel of the image may have values for different color components, such as red, green, and blue color components, hue, saturation, and value color components, or other types of color components. The values for the different color components of a given pixel together make up the color of that pixel.

Computerized object detection has proven to be a difficult technical problem. Unlike the human eye and the human brain, computers have difficulty in quickly identifying what objects are present within an image. For instance, objects may be vehicles, people, and faces. Objection detection is thus the process of determining whether a given object is present within a given image, and is further the process of determining where within an image an object is located.

One process for detecting objects within an image is a two-stage approach. In a first stage, an image is analyzed to determine potential candidates, or potential areas within the image, in which a given object may be located. In the second stage, each of these potential candidates or areas is then analyzed in more detail, to determine if any of the potential candidates or areas of the image in actuality contains the object. The first stage is therefore desirably performed relatively quickly (for each location), since the entire image has to be analyzed. The second stage can then be preformed more slowly, since the potential candidates or areas of the image that may contain the object has been significantly reduced in number in the first stage.

A conventional approach to analyzing an image to determine potential candidates or areas in which a given object may be located is to employ linear filter banks. The linear filter banks may be matched filters, or templates, representing the objects themselves, or more basic shapes that correspond to the objects. Examples of the latter filter banks include Gabor filter banks, for instance. Linear filter banks are complex data structures, however, such that analyzing an image to determine potential candidates or areas in which a given object may be located using such filter banks can be a time-consuming process.

Therefore, to determine whether an image contains the object represented by one or more linear filter banks, a simple correlation function is typically used as primarily the only way to employ linear filter banks in a time-efficient manner. Particularly, Fast Fourier Transform (FFT) technology is usually employed to compute the correlation function. However, correlation is inflexible, and can provide unreliable evaluation results that are sensitive to misalignment, noise, and outliers. As a result, the first stage of the object detection process may include an inordinate number of potential candidates or areas in which an object may be located within an image, or may miss the actual area in which the object is located within an image.

For these and other reasons, therefore, there is a need for the present invention.

SUMMARY OF THE INVENTION

The present invention relates to the use of dot templates for detecting objects within images. A computer-implemented method of one embodiment of the invention is performed for each of a number of dot templates corresponding to the object to be detected within an image. Each dot template is defined as a collection of points. At each position within the image, a value of the image is determined at each point of the dot template. The dot template is effectively overlaid at the given position within the image. A score of the dot template at this position is determined, based on the values of the image determined at the points of the dot template. Where the score is greater than a predetermined threshold, it can be concluded that the object is at least potentially located within the image at the position in question at which the dot template has been effectively overlaid. In another embodiment of the invention, the dot template may be defined as the evaluation function that is employed to yield the score, as well as the collection of points.

An article of manufacture of an embodiment of the invention includes a computer-readable medium and means in the medium. The computer-readable medium may be a recordable data storage medium, or another type of computer-readable medium. The means is for locating an object within an image using one or more dot templates corresponding to the object. Each dot template is defined as a collection of points.

A computerized system of an embodiment of the invention includes a storage to store data representing an image and data representing one or more dot templates corresponding to an object to be detected within an image. Each dot template is defined as a collection of points. The computerized system further includes a mechanism, such as a computer program executed by a processor of the system, to locate the object within the image using the dot templates.

Embodiments of the invention provide for advantages over the prior art. Unlike linear filter banks, which are complex data structures, dot templates are relatively simple data structures, and thus lightweight in comparison. Therefore, an image can be quickly analyzed using dot templates to determine whether there are any potential candidates, locations, or positions within the image that may contain the desired object. Furthermore, because of the lightweight nature of the dot templates, flexible evaluation functions, or score determinations, can be employed, depending on the nature of the object to be located within an image.

Still other advantages, aspects, and embodiments of the invention will become apparent by reading the detailed description that follows, and by referring to the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention, unless explicitly indicated, and implications to the contrary are otherwise not to be made.

DETAILED DESCRIPTION OF THE INVENTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Figure 1:
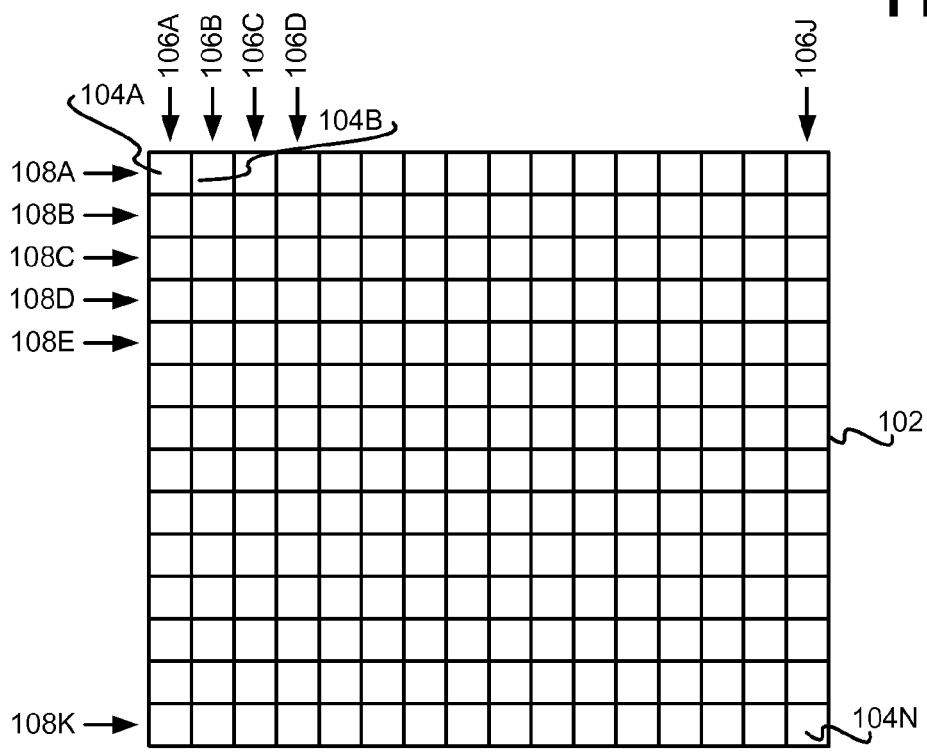
FIG. 1 is a diagram illustratively depicting the basic process of scanning a dot template against an image to determine whether there are any locations within the image that may contain the object represented by the dot template, according to an embodiment of the invention.
Figure 1:
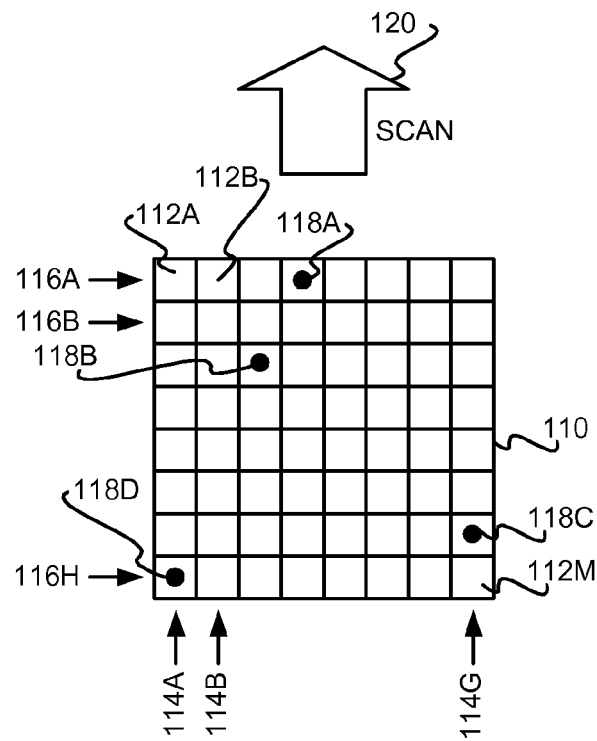

The manner by which one embodiment of the invention employs scanning a dot template against an image to determine whether there are any locations within the image that may contain an object represented by the dot template is depicted in FIG. 1. FIG. 1 includes an image 102 and a dot template 110. The image 102 includes a number of pixels 104A, 104B, ..., 104N, collectively referred to as the pixels 104. The pixels 104 of the image 102 in FIG. 1 are specifically organized along a number of columns 106A, 106B, 106C, 106D, ..., 106J, collectively referred to as the columns 106, and along a number of rows 108A, 108B, 108C, 108D, 108E, ..., 108K, collectively referred to as the rows 108.

Each of the pixels 104 of the image 102 has one or more values. Where the image 102 is a black-and-white (or grayscale) image, each of the pixels 104 has a single value, such as from 0 to $2^n-1$, where the image is an n-bit image, and which represents the intensity or brightness of the pixel relative to the other pixels. Where the image 102 is a full-color image, each of the pixels 104 has a value for each different color component of the image, such as from 0 to $2^n-1$, where the image is an n-bit image. For instance, the color components of the image may include red, green, and blue color components, such that each of the pixels 104 has a value for each of the red, green, and blue color components. The color components may further be the hue, saturation, and value color components in another embodiment of the invention. The types of color components are in general not limited by embodiments of the invention. For instance, other types of color components include hue, lightness, and saturation; cyan, magenta, yellow, and black, and so on. The values of these different color components for a given pixel together define the color of that pixel.

The dot template 110 is effectively defined against a grid of pixel areas 112A, 112B, ..., 112M, collectively referred to as the pixel areas 112. The pixel areas 112 of the dot template 110 are specifically organized along a number of columns 114A, 114B, ..., 114G, collectively referred to as the columns 114, and along a number of rows 116A, 116B, ..., 116H, collectively referred to as the rows 116. The dot template 110 is specifically defined as a number of points, 118A, 118B, 118C, and 118D, collectively referred to as the points 118, which are particularly spatially positioned against the grid of the pixel areas 112. That is, with respect to the specific grid of the pixel areas 112 of the dot template 110, the points 118 are each located at a different pixel area.

The points 118 are selected in such a way that a corresponding evaluation function can be used to determine whether a given area of the image 102 is likely to contain the object represented by the dot template 110, as is described in more detail later in the detailed description. That is, the number of the points 118, and their positions within the grid of the pixel areas 112, are selected in a particular way that a corresponding evaluation function can be used to determine whether a given area of the image 102 is likely to contain the object represented by the dot template 110. In one embodiment, the number and positions of the points 118 are selected so that there is a fewest number of points that are the fastest to evaluate, while still being able to distinguish the object in question. While there are four points 118 in the dot template 110 in FIG. 1, this is just for example purposes, and other dot templates can have more or fewer points, as will become evident later in the detailed description.

The size of the grid of the pixel areas 112—that is, the number of columns 114 and the number of rows 116 into which the pixel areas 112 are organized—is determined by at least two factors in one embodiment of the invention. First, in one embodiment each edge of the grid of the pixel areas 112 contains at least one of the points 118. For instance, the edge defined by the first row 116A contains the point 118A, the edge defined by the last row 116H contains the point 118D, the edge defined by the first column 114A contains the point 118D, and the edge defined by the last column 114B contains the point 118C.

Second, the size of the grid of the pixel areas 112 is also determined by the relative size of the object represented by the dot template 110 that is to be located within the image 102. For instance, for the image 102 of FIG. 1, it is presumed that the size of the object within the image 102 is to be G-by-H pixels somewhere within the J-by-K pixels of the image 102. Therefore, the size of the grid of the pixel areas 112 can be effectively normalized in relation to the presumed size of the object within the image 102. Where the entire image 102 is intended to either contain or not contain the object in question, the size of the grid of the pixel areas 112 can be normalized to the size of the pixels 104 within the image 102 itself. That is, in such an embodiment, the number of columns 114 and the number of rows 116 of the dot template 110 can be set equal to the number of columns 106 and the number of rows 108 of the dot template 110.

In general then, while the dot template 110 is particularly defined in relation to a given image 102 over a grid of pixel areas 112, more generally the dot template 110 is particularly defined as a collection of points 118 that are spatially interrelated in a way that can be proportionally adjusted to a desired grid of pixel areas 112. That is, the relative distances between and positions of the points 118 of the dot template 110 can be particularly set by proportional adjustment for any given size of grid of pixel areas 112. For instance, the point 118A may always be located up and to the right of the point 118B by a number of pixels that substantially adheres to the relative relationship two pixels up and one pixel over (i.e., a 2:1 relationship). If the size of the grid of pixel areas 112 is to be larger than is depicted in FIG. 1, then in actuality the point 118A may be located four pixels up and two pixels over relative to the point 118B, which still maintains the relative 2:1 relationship. In general, the dot template 110 defined as the collection of points 118 may have its points 118 rotated and scaled in relation to the placement over a grid of pixel areas 112 for analysis against the image 102.

Furthermore, the image 102 may initially be cropped prior to analysis of the dot template 110 against the image 102. For example, spurious content of the image 102 that is likely not to contain the object in question may be cropped. Thereafter, only the content of the image 102 that may contain the object in question remains, such that the image 102 is then analyzed against the image 102 after cropping.

The dot template 110 is scanned or analyzed against the image 102, as represented by the arrow 102, as follows. First, there are a number of positions, or locations, or areas, within the image 102, within which the grid of pixel areas 112 of the dot template 110 can fit, such that the dot template 110 is effectively overlaid onto these positions of the image 102. For example, the first position within the image 102 is that which has an upper left-hand pixel identified by the column 106A and the row 108A. The next position is that which has an upper left-hand pixel identified by the column 106B and the row 108A. The last position having an upper left-hand pixel identified by the row 108A is that which has an upper left-hand pixel identified by the column 106(J−G+1). That is, the last position having an upper left-hand pixel identified by the row 108A is also identified by the column within the image 102 such that the column 114G is overlaid against or onto the column 106J.

With respect to the next row 108B, the first position within the image 102 having an upper left-hand pixel identified by the row 108B is also that which has an upper left-hand pixel identified by the column 106A. Thus, in general, the positions within the image 102 against which the gird of pixel areas 112 of the dot template 110 can fit overlap one another. Where the number of columns 106 of the image 102 equals J and the number of rows 108 of the image 102 equals K, the number of columns 114 of the dot template 110 equals G and the number of rows 116 of the dot template 110 equals H, and J is greater than G and K is greater than H, there are generally (J−G+1) times (K−H+1) number of such positions. The portion of the image 200 that is overlaid by the dot template 110 at a given position can be referred to as a sub-image of the image 202 in one embodiment of the invention.

Next, at each position within the image 102 at which the dot template 110 is overlaid, the following is performed. The values of the pixels of the image 102 that are aligned with the points 118 of the dot template 110 at the position in question within the image 102 at which the dot template 110 has been overlaid are acquired. For instance, where the dot template 110 is overlaid at the position within the image 102 having the upper left-hand corner identified by the pixel 104A, the point 118A is overlaid onto, or aligned with, the pixel of the image 102 identified by the column 106D and the row 108A. Similarly, the point 118B is overlaid onto, or aligned with, the pixel of the image 102 identified by the column 106C and the row 108C. As a final example, the point 118D is overlaid onto, or aligned with, the pixel of the image 102 identified by the column 106A and the row 108E, where the dot template 110 is overlaid at the position within the image 102 having the upper left-hand corner identified by the pixel 104A.

These values of the pixels of the image 102 at the points 118 of the dot template 110 are then evaluated in some manner to determine a score. The evaluation of the values of the image 102 at the points 118 of the dot template 110 is not limited by embodiments of the invention. In general, the particular object being detected within the image 102 as specified by the dot template 110 dictates to some degree how the values of the image 102 at the points 118 of the dot template 110 are to be evaluated. In at least some embodiments of the invention, the evaluation of these values of the image 102 at the points 118 of the dot template 110 result in a single numerical score, or value. The values may be the color values of each pixel, the single contrast/grayscale/black-and-white value of each pixel, or the color values or single value of each pixel as are then adjusted or manipulated in some fashion.

This numerical score provides a measure of the likelihood that the particular position in question of the image 102 potentially contains the object to which the dot template 110 corresponds. Thus, where the score determined is greater than a predetermined threshold, it can be concluded that the object is potentially located within the image 102 at this position. Because the dot template 110 is scanned against all possible position within the image 102 within which it will fit, there may be more than one position within the image 102 at which the object to which the dot template 110 corresponds is potentially located.

It is noted that in at least some embodiments of the invention, the fact that an object is potentially located at a given position within the image 102 does not necessarily mean that the object is indeed located at this position within the image 102. Stated another way, in such embodiments of the invention, the utilization of the dot template 110 achieves the initial stage of object detection within the image 102, where potential locations within the image 102 at which the object may be located are determined. Thereafter, conventional and other approaches may be employed in the second stage of object detection within the image 102, where the potential locations within the image 102 at which the object may be located, as identified by utilization of the dot template 110, are then analyzed in further detail. However, in other embodiments, the dot templates are used to definitively locate the position of an object within the image 102, as opposed to merely denoting potential locations of the object within the image 102.

Furthermore, for a given object to be detected within the image 102, more than one dot template may be employed as corresponding to the object to be detected. For instance, there may be more than one view or perspective of the object, where each view or perspective of the object has a corresponding dot template. One dot template may correspond to a front view of the object, a second dot template may correspond to a left side view of the object, and a third dot template may correspond to a right side view of the object, as just one example. Indeed, the number of dot templates needed for a particular class of objects to be detected within the image 102 can also depend on the amount of variation expected of the object within the image 102. Besides a front view, a left side view, and a right side view, for instance, there may be dot templates corresponding to these three views that are scaled and/or rotated.

Examples of different types of dot templates, as corresponding to different types of objects that are to be detected within images, are now provided. As can be appreciated by those of ordinary skill within the art, these examples are just that, examples, and do not limit the invention insofar as the types of objects for which dot templates can be employed. Most of the examples presented here relate to facial aspects of human faces, for instance, such that other embodiments of the invention may use dot templates to assist in the detection objects that are not facial aspects of human faces.

Figure 2:
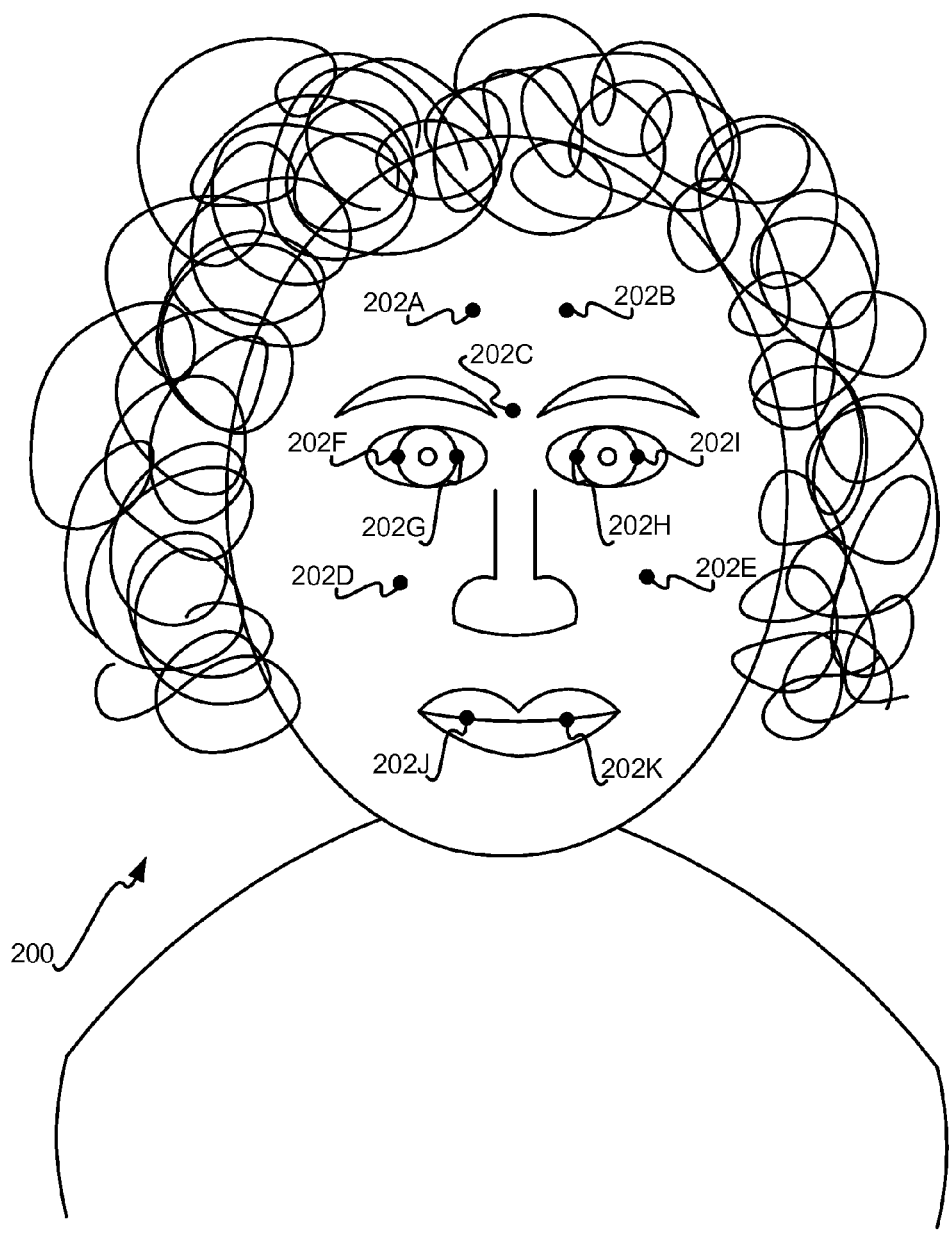
FIG. 2 is a diagram of a front view facial object in relation to which a dot template has been defined, according to an embodiment of the invention.

FIG. 2 shows a representative line drawing of an example front view facial image 200 on which a dot template has been defined, according to an embodiment of the invention. The facial image 200 is depicted as a line drawing in FIG. 2 for illustrative convenience and clarity, but in actuality can be a digital image of an actual human face, as may be stored in a JPG or other suitable file format. The dot template for such a front view face object as depicted in FIG. 2 includes eleven points 202A, 202B, 202C, 202D, 202E, 202F, 202G, 202H, 202I, 202J, and 202K, collectively referred to as the points 202, and that define the dot template.

The points 202A, 202B, and 202C correspond to a nose region of the face of the image 200, which can be considered as including a portion of a forehead region of the face as well. The values of an actual image at a position against which the dot template has been overlaid, at the points 202A, 202B, and 202C, may be referred to as $I_1$, $I_2$, and $I_3$. The points 202D and 202E correspond to a left cheek region and a right cheek region of the face of the image 200, respectively, and the values of an actual image at a position against which the dot template has been overlaid, at these points, may be referred to as $I_4$ and $I_5$. All of the points 202A, 202B, 202C, 202D, and 202E are lighter in contrast than the other points 202F, 202G, 202H, 202I, 202J, and 202K, because they represent locations of the face corresponding to skin and that are lighter in contrast than the locations represented by the other points, for nearly all human faces.

The points 202F and 202G and the points 202H and 202I correspond to a left eye region and a right eye region of the face of the image 200, respectively, and the values of an actual image at a position against which the dot template has been overlaid, at these points, may be referred to as $I_6$, $I_7$, $I_8$, and $I_9$. The points 202J and 202K correspond to a lips/mouth region of the face of the image 200, and the values of an actual image at a position against which the dot template has been overlaid, at these points, may be referred to as $I_{10}$ and $I_{11}$. Thus, the points 202F, 202G, 202H, 202I, 202J, and 202K are darker in contrast than the other points 202A, 202B, 202C, 202D, and 202E, because they represent locations of the face corresponding to eyes and lips/mouth and that are darker in contrast than the locations represented by the other points, for nearly all human faces.

When the dot template defined by the points 202 is scanned or analyzed against a position of an actual image, it is said that the points 202 correspond to or represent potential regions, since the position of the actual image may or may not be the image represented by the dot template. That is, for example, the points 202D and 202E correspond to potential cheek regions when the dot template defined by the points 202 is scanned against a position of an actual image, since the pixels of the image to which the points 202D and 202E correspond may or may not be part of cheek regions of a face within the image at the position in question. Nevertheless, the values of the image for the points 202 at the position against which the dot template defined by the points 202 are determined, and then evaluated to determine whether this position represents an actual face within the image.

In particular, in one embodiment of the invention, the following evaluation function is used to score the dot template as overlaid against a particular position of an actual image:

$$\text{score} = \frac{\min[I_1, I_2, I_3] + I_4 + I_5 - \max[I_6, I_7] - \max[I_8, I_9] - \max[I_{10}, I_{11}]}{\max[I_1, I_2, I_3, I_4, I_5] - \min[I_6, I_7, I_8, I_9]} \quad (1)$$

In equation (1), each of the pixel values $I_k$ is the pixel value as noted above for a given number k. The pixel values are particularly grayscale or single values of the pixels. That is, for the purposes of detection of a front view face object represented by the dot template defined by the points 202, the image against which the dot template is defined is either in grayscale, or is first converted from full color to grayscale.

Thus, the value score increases where the dot template has been overlaid at a position of the image corresponding to a face. That is, the pixel values $I_k$ for k=1 . . . 5 are lighter, or smaller, and the pixel values $I_k$ for k=6 . . . 11 are darker, or greater. Furthermore, the evaluation function of equation (1) is robust, because even if a few of the points 202 do not satisfy this general rule, the value score will still be sufficiently high to denote that the image in question at the overlaid position contains a face. For an arbitrary, non-facial image, the likelihood is by comparison that most or all of the points will not satisfy the rule, and the value score will be sufficiently low. Therefore, the dot template of FIG. 2, where an appropriate threshold against which the value score is to be compared has been selected, allows for rejection of more than 99% of non-face images while practically not rejecting any actual face images.

Figure 3:
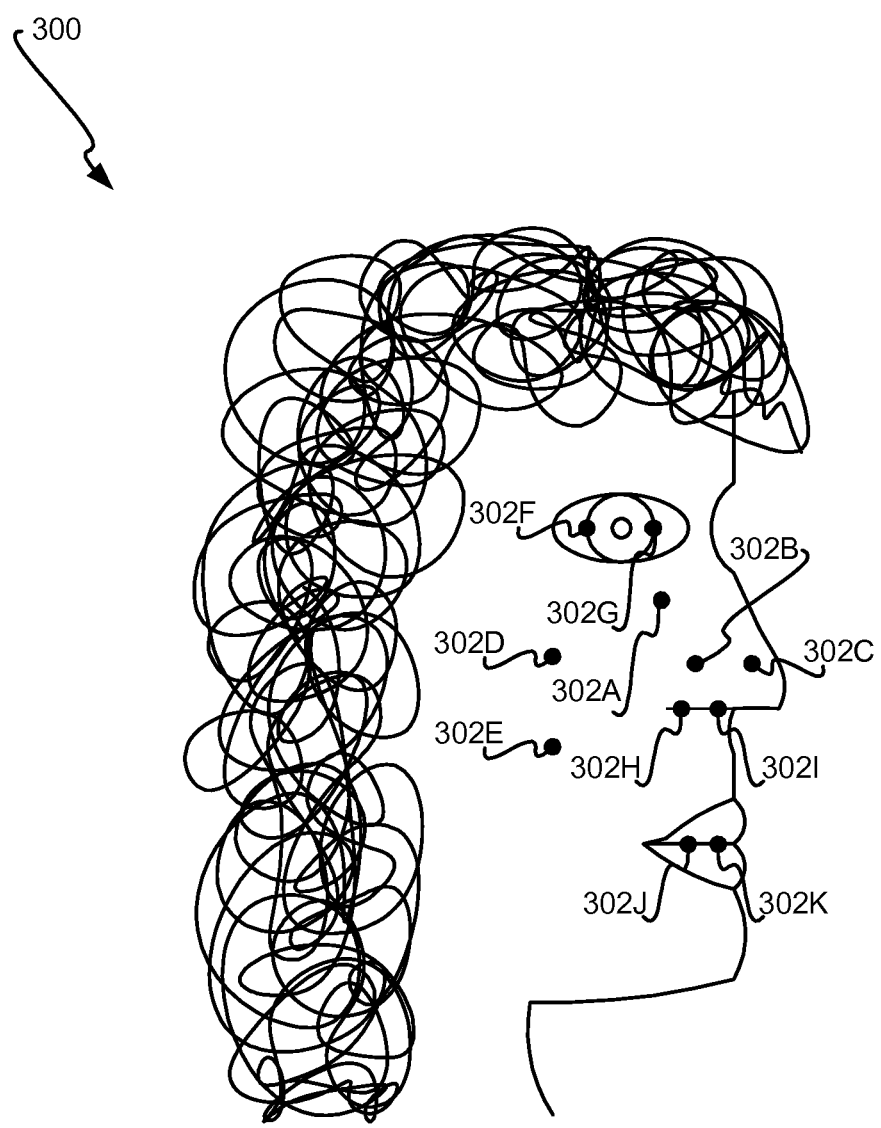
FIG. 3 is a diagram of a side view facial object in relation to which a dot template has been defined, according to an embodiment of the invention.

FIG. 3 shows a representative line drawing of an example side view facial image 300 on which a dot template has been defined, according to an embodiment of the invention. The facial image 300 is depicted as a line drawing in FIG. 3 for illustrative convenience and clarity, but in actuality can be a digital image of an actual human face, as may be stored in a JPG or other suitable file format. The dot template for such a side view face object as depicted in FIG. 3 includes eleven points 302A, 302B, 302C, 302D, 302E, 302F, 302G, 302H, 302I, 302J, and 302K, collectively referred to as the points 302, and that define the dot template.

The points 302A, 302B, and 302C correspond to a nose region of the face of the image 300. The values of an actual image at a position against which the dot template has been overlaid, at the points 302A, 302B, and 302C, may be referred to as $I_1$, $I_2$, and $I_3$. The points 302D and 302E correspond to a cheek region of the face of the image 300, respectively, and the values of an actual image at a position against which the dot template has been overlaid, at these points, may be referred to as $I_4$ and $I_5$. All of the points 302A, 302B, 302C, 302D, and 302E are lighter in contrast than the other points 302F, 302G, 302H, 302I, 302J, and 302K, because they represent locations of the face corresponding to skin and that are lighter in contrast than the locations represented by the other points, for nearly all human faces.

The points 302F and 302G correspond to an eye region of the face of the image 300, and the values of an actual image at a position against which the dot template has been overlaid, at these points, may be referred to as $I_6$ and $I_7$. The points 302H and 302I correspond to a nostril region of the face of the image 300, and the values of an actual image at a position against which the dot template has been overlaid, at these points, may be referred to as $I_8$ and $I_9$. The points 302J and 302K correspond to a lips/mouth region of the face of the image 300, and the values of an actual image at a position against which the dot template has been overlaid, at these points, may be referred to as $I_{10}$ and $I_{11}$. Thus, the points 302F, 302G, 302H, 302I, 302J, and 302K are darker in contrast than the other points 302A, 302B, 302C, 302D, and 302E, because they represent locations of the face corresponding to eyes and lips and that are darker in contrast than the locations represented by the other points, for nearly all human faces.

As with the dot template of FIG. 2, when the dot template of FIG. 3 defined by the points 302 is scanned or analyzed against a position of an actual image, it is said that the points 302 correspond to or represent potential regions, since the position of the actual image may or may not be the image represented by the dot template. That is, for example, the points 302D and 302E correspond to potential cheek regions when the dot template defined by the points 302 is scanned against a position of an actual image, since the pixels of the image to which the points 302D and 302E correspond may or may not be part of cheek regions of a face within the image at the position in question. Nevertheless, the values of the image for the points 302 at the position against which the dot template defined by the points 302 are determined, and then evaluated to determine whether this position represents an actual face within the image. An evaluation function similar to that of equation (1), as has been described above, may be employed in relation to the dot template of FIG. 3 as well.

FIGS. 2 and 3 thus depict dot templates, defined by points 202 and 302, that can be employed to locate a front view face object and a side view face object, respectively, within an image. In other embodiments, the image may include a face, but the object that is desired to be detected within the image is a facial feature object. Such facial feature objects may include a face edge, such as the edge of a jaw or chin, or eyes, eyebrows, or nostrils, or other types of facial features, like lips, and so on.

Figure 4A:
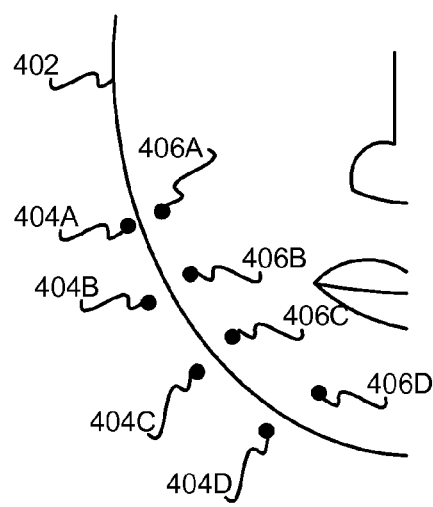
FIGS. 4A and 4B are diagrams of facial edge objects in relation to which dot templates have been defined, according to varying embodiments of the invention.
Figure 4B:
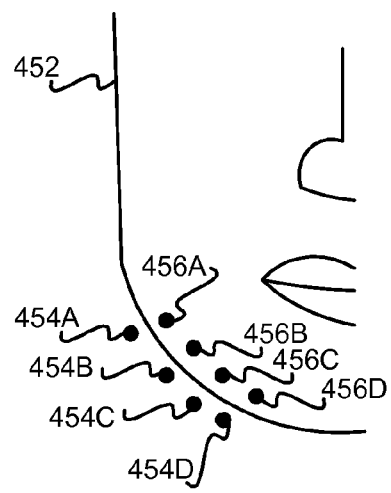

FIGS. 4A and 4B show representative line drawings of example partial front view facial images 400 and 450 on which dot templates have been defined for identifying face edges 402 and 452 within the images 400 and 450, according to varying embodiments of the invention. FIG. 4A is exemplarily described as representative of both FIGS. 4A and 4B. That is, whereas the image 400 is described, in relation to its face edge 402 and its points 404A, 404B, 404C, 404D, 406A, 406B, 406C, and 406D, this description is also relevant to the image 450, in relation to its face edge 452 and its points 454A, 454B, 454C, 454D, 456A, 456B, 456C, and 456D. The difference between FIGS. 4A and 4B is that the face edge 402 is more equine or elongated in nature, and the face edge 452 is more square-jawed in nature.

As with the images of FIGS. 2 and 3, the image 400 is depicted as a line drawing in FIG. 4A for illustrative convenience and clarity, but in actuality can be a digital image of an actual human face, as stored in a JPG or other suitable file format. The dot template for the face edge object as depicted in FIG. 4A includes eight points that define the dot template: the points 404A, 404B, 404C, and 404D, collectively referred to as the points 404, and the points 406A, 406B, 406C, and 406D, collectively referred to as the points 406. The points 404 relate to the points 406 in that the points 404 are non-face-side points, not located within the face of the image 400, whereas the points 406 are face-side points, located within the face of the image 400. It is noted that only four points 404 and only four points 406 are depicted in FIG. 4A for illustrative convenience. In actuality, there can be ten or more of the points 404 and ten or more of the points 406.

Therefore, four point pairs may be defined, with each point pair having one point from the points 404 and one point from the points 406. These point pairs are points 404A and 406A, 404B and 406B, 404C and 406C, and 404D and 406D. For any given point pair, the values of an actual image at a position against which the dot template has been overlaid, at the points of the point pair, may be referred to as $I_1$ and $I_2$, where $I_1$ is the face-side point value and $I_2$ is the non-face-side point value. For instance, with respect to the point pair having the points 404A and 406A, $I_1$ is the value of the image corresponding to the face-side point 406A, and $I_2$ is the value of the image corresponding to the non-face-side point 404A. When evaluated against an actual face edge, the pixel values at the points 404 are likely to be either greater in contrast or lighter in contrast than the pixel values at the points 406.

As before, when the dot template defined by the points 404 and 406 is scanned or analyzed against a position of an actual image, it is said that the points 404 and 406 correspond to or represent potential regions, since the position of the actual image may or may not be the image represented by the dot template. That is, the points 404 and 406 correspond to potential face edges when the dot template defined by the points 404 and 406 is scanned against a position of an actual image, since the pixels of the image to which the points 404 and 406 correspond may or may not be to either side of a face edge within the image at the position in question. Also as before, the values of the image for the points 404 and 406 at the position against which the dot template defined by these points are determined, and then evaluated to determine whether this position represents an actual face edge within the image.

In particular, in one embodiment of the invention, the following evaluation function is used to score the dot template as overlaid against a particular position of an actual image:

$$\text{score} = \sum_{pnt\ pairs} \frac{\text{abs}(I_1 - I_2)}{(I_1 + I_2)} \qquad (2)$$

In equation (2), the pixel values $I_1$ and $I_2$ for each pair of points as noted above are evaluated. The pixel values are particularly grayscale or single values of the pixels. That is, for the purposes of detection of a front view face object represented by the dot template defined by the points 404 and 406, the image against which the dot template is defined is either in grayscale, or is first converted from full color to grayscale.

Thus, the value score increases where the dot template has been overlaid at a position of the image corresponding to a face edge. That is, the pixel value $I_1$ is likely to be greater (or darker) or smaller (or lighter) than the pixel value $I_2$ within a given point pair. The face-side point pixel value is likely to be darker than the non-face-side pixel value where the background is relatively light, and/or where the face of the image in question has dark skin. By comparison, the face-side point pixel value is likely to be lighter than the non-face-side pixel value where the background is relatively dark, and/or where the face of the image in question has light skin.

It is noted that summation in equation (2) is performed not over all the point pairs but only over a part (e.g., half) of them with the lowest contrast. In this way just the contours of the appropriate shape will have high scores, while one or two irrelevant point pairs with high contrast will not result in a false candidate. Furthermore, it is noted that there may be a relatively large number of different curvatures of face edges found in human faces. Thus, FIG. 4B is shown in addition to FIG. 4A to depict how different dot templates can be defined for the same type of object to be detected within an image. Furthermore, while just two dot templates for a face edge are depicted in FIGS. 4A and 4B, in actuality there may be a half-dozen or more of such dot templates, to capture as much as possible the different variations in face edge curvature found in different actual human faces.

Figure 5A:
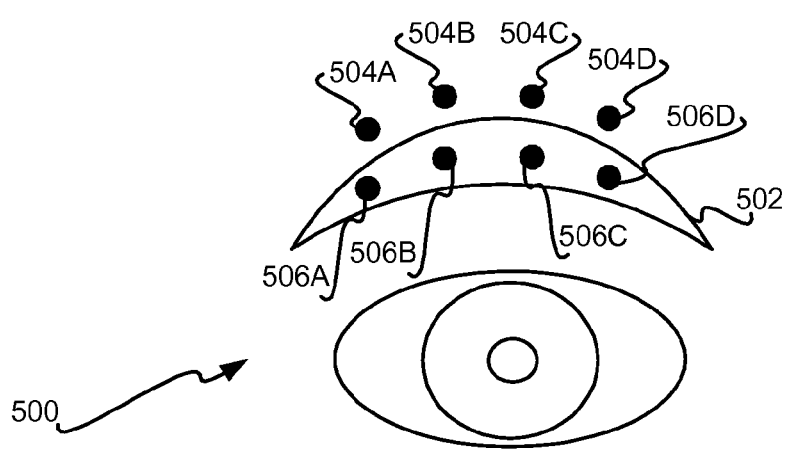
FIGS. 5A, 5B, and 5C are diagrams of facial feature objects in relation to which dot templates have been defined, according to varying embodiments of the invention.
Figure 5B:
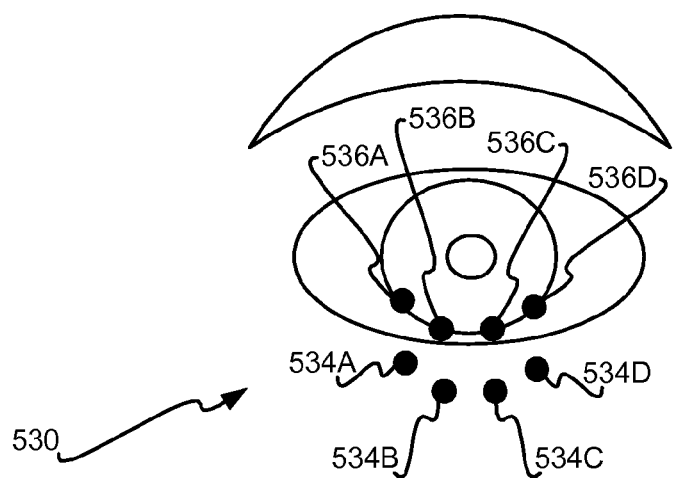
Figure 5C:
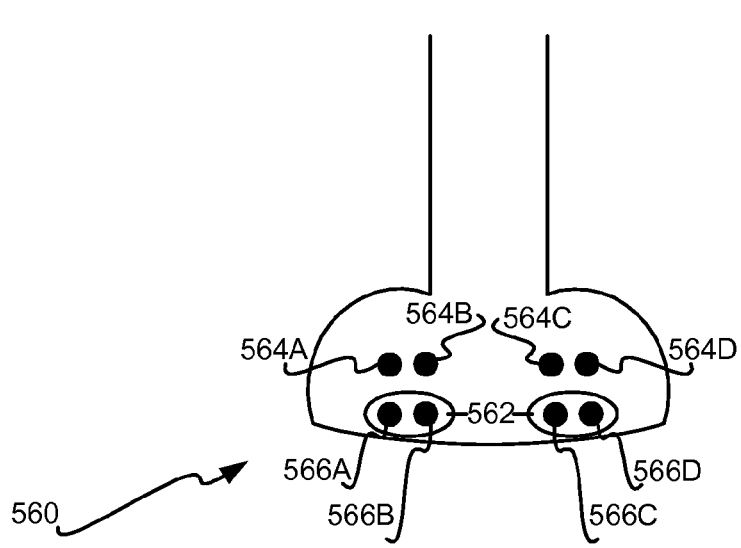

The above description of FIGS. 4A and 4B in relation to face edge objects is also applicable to the detection of other types of facial feature objects in which differences in contrast can be employed. FIGS. 5A, 5B, and 5C, for instance, show representative line drawings of example partial front view facial images 500, 530, and 560 containing an eyebrow 502, an eye 532, and nostrils 562, respectively, according to varying embodiments of the invention. FIG. 5A is exemplarily described as representation of FIGS. 5A, 5B, and 5C. That is, whereas the image 500 of FIG. 5A is described, in relation to its eyebrow 502 and its points 504 and 506, this description is also relevant to the image 530 of FIG. 5B, in relation to its eye 532 and its points 534 and 536, and to the image 560 of FIG. 5C, in relation to its nostrils 562 and its points 564 and 566. The commonality among all of FIGS. 5A, 5B, and 5C is that the points outside of the facial feature in question are lighter in contrast as compared to the points inside the facial feature in question. Thus, the eyebrow 502 of FIG. 5A is representative for purposes of object detection analysis of the eye 532 of FIG. 5B and of the nostrils 562 of FIG. 5C.

The image 500 is depicted as a line drawing in FIG. 5A for illustrative convenience and clarity, but in actuality can be a digital image or an actual human face, as stored in a JPG or other suitable file formats. The dot template for the eyebrow object as depicted in FIG. 5A includes eight points that define the dot template: the points 504A, 504B, 504C, and 504D, collectively referred to as the points 504, and the points 506A, 506B, 506C, and 506D, collectively referred to as the points 506. (Likewise, the dot template for the eye object 532 in FIG. 5B includes eight points that define it: the points 534A, 534B, 534C, and 534D, collectively referred to as the points 534, and the points 536A, 536B, 536C, and 536D, collectively referred to as the points 536. The dot template for the nostrils object 562 in FIG. 5C similarly includes eight points that define it: the points 564A, 564B, 564C, and 564D, collectively referred to as the points 564, and the points 566A, 566B, 566C, and 566D, collectively referred to as the points 566.)

The points 504 relate to the points 506 in that the points 504 are non-face feature-side points, not located within the eyebrow 502 of the image 500, whereas the points 506 are face feature-side points, located within the eyebrow 502 of the image 500. It is noted that only four points 504 and only four points 506 are depicted in FIG. 5A for illustrative convenience. In actuality, there can be ten or more of the points 504 and ten or more of the points 506.

Therefore, four point pairs may be defined, with each point pair having one point from the points 504 and one point from the points 506. These point pairs are points 504A and 506A, 504B and 504B, 504C and 506C, and 504D and 506D. For any given point pair, the values of an actual image at a position against which the dot template has been overlaid, at the points of the point pair, may be referred to as $I_1$ and $I_2$, where $I_1$ is the face-side point value and $I_2$ is the non-face-side point value. For instance, with respect to the point pair having the points 504A and 506A, $I_1$ is the value of the image corresponding to the face feature-side point 506A, and $I_2$ is the value of the image corresponding to the non-face feature-side point 504A. When evaluated against an actual eyebrow, the pixel values at the points 504 are likely to be lighter in contrast than the pixel values at the points 406.

As before, when the dot template defined by the points 504 and 506 is scanned or analyzed against a position of an actual image, it is said that the points 504 and 506 correspond to or represent potential regions, since the position of the actual image may or may not be the image represented by the dot template. That is, the points 504 and 506 correspond to a potential face feature (e.g., a potential eyebrow) when the dot template defined by the points 504 and 506 is scanned against a position of an actual image, since the pixels of the image to which the points 404 and 406 correspond may or may not be to either side of an actual face feature (e.g., an actual eyebrow) within the image at the position in question. Also as before, the values of the image for the points 504 and 506 at the position against which the dot template defined by these points are determined, and then evaluated to determine whether this position represents an actual face feature (e.g., an actual eyebrow) within the image.

In particular, in one embodiment of the invention, the following evaluation function is used to score the dot template as overlaid against a particular position of an actual image:

$$\text{score} = \sum_{pnt\ pairs} \frac{(I_1 - I_2)}{(I_1 + I_2)} \quad (3)$$

In equation (3), the pixel values $I_1$ and $I_2$ for each pair of points as noted above are evaluated. The pixel values are particularly grayscale or single values of the pixels. That is, for the purposes of detection of a front view face object represented by the dot template defined by the points 404 and 406, the image against which the dot template is defined is either in grayscale, or is first converted from full color to grayscale.

Thus, the evaluation function of equation (3) is similar to that of equation (2), except that the difference of the numerator is not made into an absolute value. The reason why this is the case is that in equation (2), it is not known whether the face of the image is against a light background or a dark background. By comparison, in equation (3), it is always presumed that the face feature in question, such as the eyebrow 502, will be darker than the surrounding skin, such that the difference will be presumed to yield a positive value that does not have to be made into an absolute value. The value score thus increases where the dot template has been overlaid at a position of the image corresponding to a face feature like the eyebrow 502. That is, the pixel value $I_1$ is likely to be greater (or darker) than the pixel value $I_2$ within a given point pair.

The evaluation function of equation (3) is again robust, because even if just one or two of the points 504 and 506 do not satisfy the general rule of the previous paragraph, the value score will still be sufficiently high to denote that the image in question at the overlaid position contains the face feature in question. For an arbitrary, non-face feature image, the likelihood is by comparison that most or all of the points will not satisfy the rule, and the value score will be sufficiently low. Therefore, selection of an appropriate threshold against which the value score is to be compared allows for high rejection of non-face feature images, while rejecting few if any actual face feature images. In addition, the summation of equation (3) may not be performed for all the point pair pixel values, but rather just for a portion of them, such as half of them, where outliers are eliminated to render the value score more statistically reliable.

Figure 6:
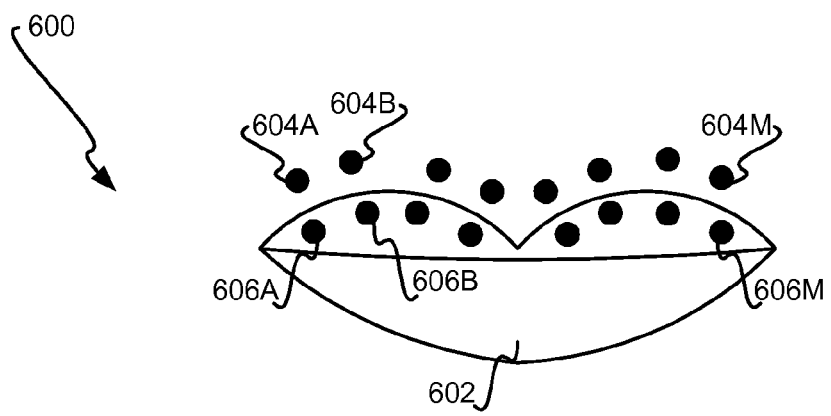
FIG. 6 is a diagram of a lips object in relation to which a dot template has been defined, according to an embodiment of the invention.

The basic form of the dot templates of FIGS. 4A, 4B, and 5A-5C, in which there are point pairs having one point to a face-side or a face feature-side and another point to a non-face-side or a non-face feature-side, can be utilized in relation to other types of scoring evaluation functions as well. For example, FIG. 6 shows a representative line drawing of an example partial facial image 600 on which a dot template has been defined for identifying lips 602 within the image 600, according to an embodiment of the invention. As with the previous images, the image 600 is depicted as a line drawing for illustrative convenience and clarity, but in actuality can be a digital image of an actual human face, as stored in a JPG or other suitable format.

The dot template for the lips object as depicted in FIG. 6 includes a number of points that define the dot template: the points 604A, 604B, ..., 604M, collectively referred to as the points 604, and the points 606A, 606B, ..., 606M, collectively referred to as the points 606. The points 604 relate to the points 606 in that the points 604 are non-lips-side points, not located within the lips 602, whereas the points 606 are lips-side points, located within the lips 602. It is noted that only a limited number points 604 and only a limited number of points 606 are depicted in FIG. 6 for illustrative convenience. In actuality, there can be ten or more points 604 and ten or more points 606.

Therefore, four point pairs may be defined, with each point pair having one point from the points 604 and one point from the points 606. These point pairs are points 604A and 606A, 604B and 606B, and so on, through 604M and 606M. For any given point pair, the values of an actual image at a position against which the dot template has been overlaid, at the points of the point pair, may be referred to as $I_1$ and $I_2$, where $I_1$ is the lips-side point value and $I_2$ is the non-lips-side point value. For instance, with respect to the point pair having the points 604A and 606A, $I_1$ is the value of the image corresponding to the lips-side point 606A, and $I_2$ is the value of the image corresponding to the non-lips-side point 604A.

As before, when the dot template defined by the points 604 and 606 is scanned or analyzed against a position of an actual image, it is said that the points 604 and 606 correspond to or represent potential regions, since the position of the actual image may or may not be the image represented by the dot template. That is, the points 604 and 606 correspond to potential lips when the dot template defined by the points 604 and 606 is scanned against a position of an actual image, since the pixels of the image to which the points 604 and 606 correspond may or may not be to either side of lips within the image at the position in question. Also as before, the values of the image for the points 604 and 606 at the position against which the dot template defined by these points are determined, and then evaluated to determine whether this position represents actual lips within the image.

In particular, in one embodiment of the invention, the following evaluation function is used to score the dot template as overlaid against a particular position of an actual image:

$$\text{score} = \sum_{pnt\ pairs} g_1 - g_2 \quad (4)$$

In equation (4), the pixel values $I_1$ and $I_2$ for each pair of points as noted above are evaluated. In particular, $$g_X = \frac{G_X}{R_X + G_X + B_X},$$

and $R_X$, $G_X$, $B_X$ are red, green, and blue values of the image at the point $I_X$. This is because, for the detection of lips, grayscale contrast can often be insignificant. By comparison, it is beneficial to use the color information contained within the image. Lips typically have higher content of red and lower content of green as compared to the surrounding skin. Thus, in the example of FIG. 6, the same form of dot templates as in FIGS. 4A, 4B, and 5A-5C is employed, but rather than using grayscale pixel values, the color values of the pixels are instead utilized.

As before, the value score increases where the dot template has been overlaid at a position of the image corresponding to lips. The evaluation function of equation (4) is again robust, because even if just one or two of the points 604 and 606 do not satisfy the general rule encapsulated in the evaluation function, the value score will still be sufficiently high to denote that the image in question at the overlaid position contains lips. For an arbitrary, non-lips image, the likelihood is by comparison that most or all of the points will not satisfy the rule, and the value score will be sufficiently low. Therefore, selection of an appropriate threshold against which the value score is to be compared allows for high rejection of non-lips images, while rejecting few if any actual lips images. In addition, the summation of equation (4) may not be performed for all the point pair pixel values, but rather just for a portion of them, such as half of them, where outliers are eliminated to render the value score more statistically reliable. For example, summing over just the lowest-scoring point pairs greatly increases the discriminatory ability of the evaluation function of equation (4).

Figure 7:
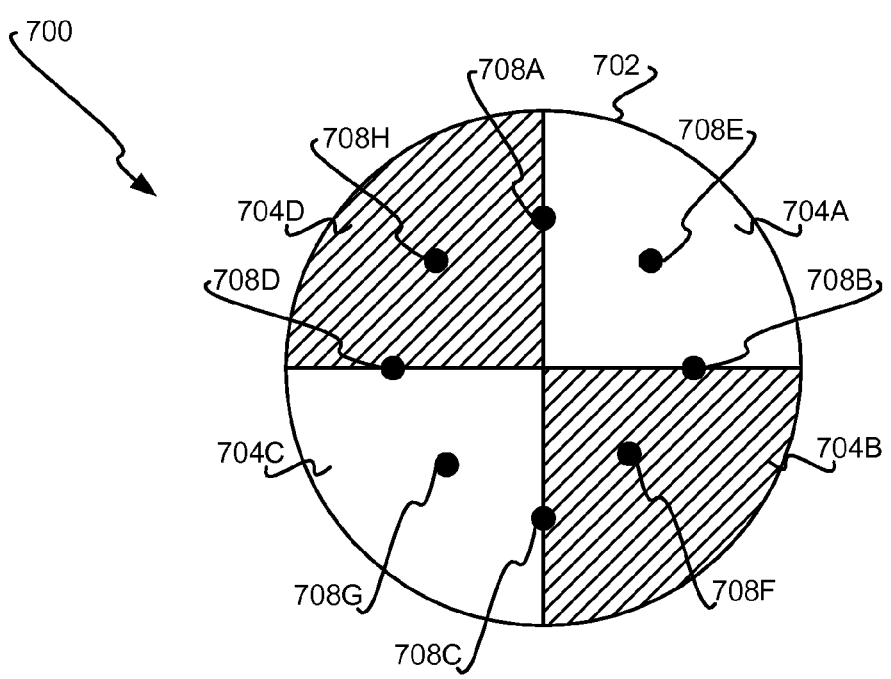
FIG. 7 is a diagram of a particular marker object in relation to which a dot template has been defined, according to an embodiment of the invention.

It is finally noted that whereas embodiments of the invention have been thus far described in relation to faces and facial features as objects that are to be detected within images, in other embodiments of other types of objects may also be detected. For example, FIG. 7 shows an image 700 on which a dot template has been defined for identifying a particular marker 702 within the image 700, according to an embodiment of the invention. The marker 702 is of the type commonly found on crash-test dummies and other types of tests, and thus may be useful to locate within images for analytical and other purposes. The image 700 may be a digital image of an actual thing on which the marker 702 is present, for instance, as stored in a JPG or other suitable format.

The marker 702 is divided into quarters 704A, 704B, 704C, and 704D, collectively referred to as the quarters 704. Opposite quarters are commonly colored. Thus, as shown in FIG. 7, the quarters 704A and 704C are lighter in contrast, and the quarters 704B and 704D are darker in contrast. The dot template for the marker object as depicted in FIG. 7 includes eight points that define the dot template, the points 708A, 708B, 708C, 708D, 708E, 708F, 708G, and 708H, collectively referred to as the points 708. It is noted that while the points 708 are defined in relation to the marker 702 having a particular orientation and rotation, this is for descriptive purposes only, and in actuality the dot template defined by the points 708 as depicted in FIG. 7 are capable of being employed to detect any orientation, rotation, or even in some instances size of the marker 702, as will become evident when description of the evaluation function used for this dot template is provided.

The points 708A, 708B, 708C, and 708D are thus in the particular rotation and orientation of the marker 702 in FIG. 7 located on edges between adjacent of the quarters 704, and the values of an actual image at a position against which the dot template has been overlaid, at these points, may be referred to as $I_1$, $I_2$, $I_3$, and $I_4$. The points 708E, 708F, 708G, and 708G are located in the particular rotation and orientation of the marker 702 in FIG. 7 within the quarters 704 themselves, and the values of an actual image at a position against which the dot template has been overlaid, at these points, may be referred to as $I_5$, $I_6$, $I_7$, and $I_8$. Furthermore, in the particular rotation and orientation of the marker 702 in FIG. 7, the points 708E and 708G are located in the lighter-contrast quarters 704A and 704C, and the points 708F and 704H are located in the darker-contrast quarters 704B and 704D.

As before, when the dot template defined by the points 708 is scanned or analyzed against a position of an actual image, it is said that the points 708 correspond to or represent potential regions, since the position of the actual image may or may not be the image represented by the dot template. The values of the image for the points 708 at the position against which the dot template defined by the points 708 are determined, and then evaluated to determine whether this position represents an actual marker within the image. In particular, in one embodiment of the invention, the following evaluation function is used to score the dot template as overlaid against a particular position of an actual image:

$$\text{score} = \max\left[\frac{\min[I_1, I_3]}{\max[I_2, I_4]}, \frac{\min[I_2, I_4]}{\max[I_1, I_3]}, \frac{\min[I_5, I_7]}{\max[I_6, I_8]}, \frac{\min[I_6, I_8]}{\max[I_5, I_7]}\right] \quad (5)$$

In equation (5), each of the pixel values $I_k$ is the pixel value as noted above for a given number k. The pixel values are particularly grayscale or single values of the pixels. That is, for the purposes of detection of a marker object represented by the dot template defined by the points 708, the image against which the dot template is defined is either in grayscale, or is first converted from full color to grayscale. The value score increases where the dot template has been overlaid at a position of the image corresponding to the marker in question.

In general, if the point group including the points 708A, 708B, 708C, and 708D, and/or the point group including the points 708E, 708F, 708G, and 708H has two points across from each other for which the pixel values are substantially lighter than the other two points, the current position is considered a likely candidate for a marker object. Stated another way, while the dot template is defined in FIG. 7 in relation to the marker 702 being at a particular orientation or rotation, the dot template itself is capable of detecting the marker regardless of its orientation or rotation. In other words, a single scan using this dot template can thus be considered as encompassing all rotations and sizes of the marker object.

Figure 8:
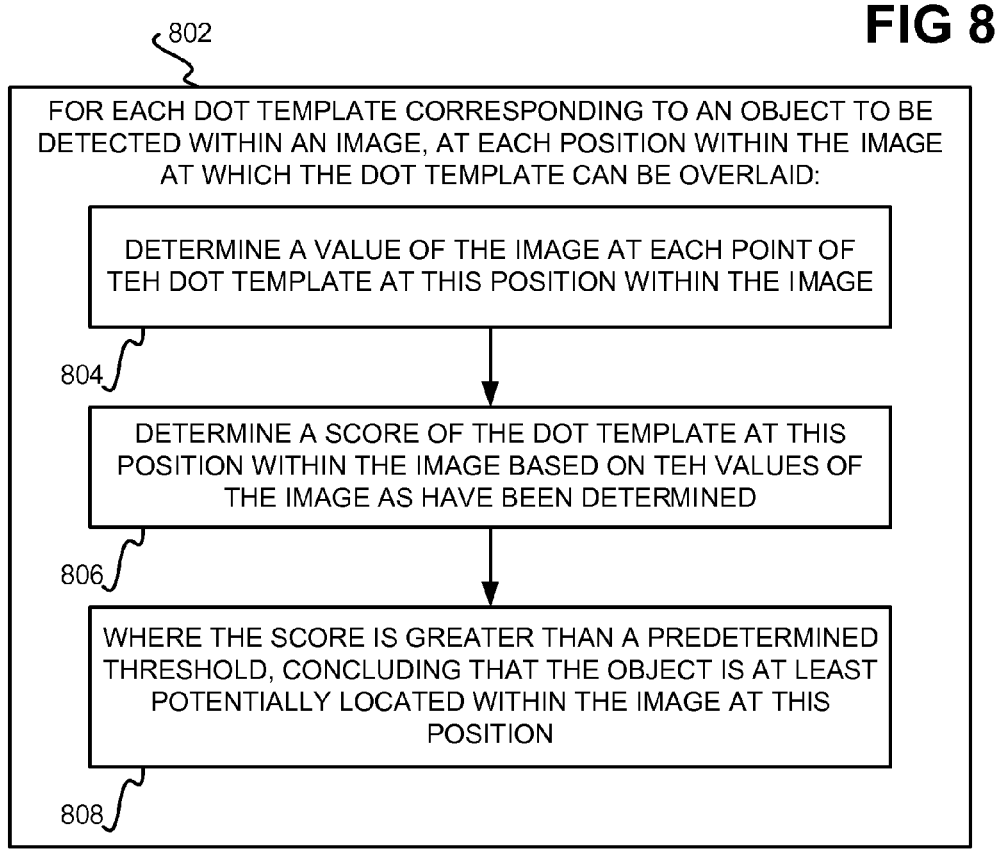
FIG. 8 is a flowchart of a method for employing one or more dot templates corresponding to an object to locate the object within an image, according to an embodiment of the invention.

FIG. 8 shows a method 800 that effectively summarizes the description that has been provided as for the utilization of one or more dot templates corresponding to an object in the detection of the object within an image, according to an embodiment of the invention. The method 800 may be implemented at least in part by a computer program having one or more computer program parts, objects, subroutines, and so on. Such a computer program may be stored on a computer-readable medium, like a recordable data storage medium or another type of computer-readable medium.

The method 800 is performed for each dot template that corresponds to the object to be detected within an image, and is also performed for each position within the image at which a dot template can be overlaid within the image, as has been described (802). Therefore, first, the method 800 determines a value of the image at each point of the dot template in question at the position in question within the image (804). For instance, the value of the image at each point of the dot template may be the value of the pixel of the image corresponding to each point of the dot template. There may be one such value for each pixel, or numerous such values for each pixel, such as where the image in question is a color image having a number of color component values for each pixel.

Next, a score of the dot template is determined at this position within the image, based on the values of the image as have been determined (806). The score is determined by evaluating a particular evaluation function for the dot template in question, examples of which have been described above. Where the score is greater than a predetermined threshold (808), it can be concluded that the object is at least potentially located within the image at this position. The predetermined threshold may be determined by trial-and-error based on determining the scores of the dot template against a number of test images. In one embodiment, it is just concluded that the object is potentially located within the image at the position in question, such that further analysis can be accomplished to determine if the object is indeed located at this position within the image. In another embodiment, it may be definitively concluded that the object is indeed located within the image at the position in question.

Figure 9:
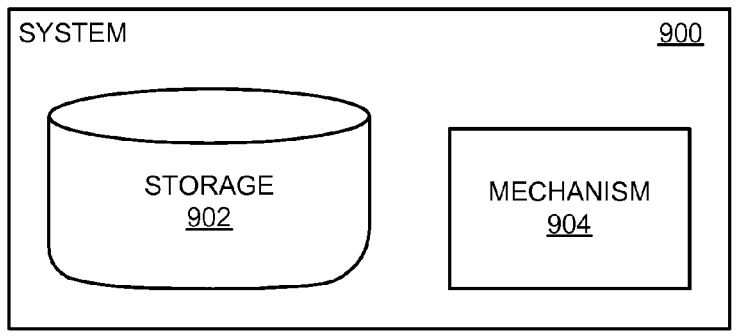
FIG. 9 is a diagram of a system, according to an embodiment of the invention.

Finally, FIG. 9 shows a rudimentary and representative system 900, according to an embodiment of the invention. The system 900 is depicted in FIG. 9 as including a storage 902 and a mechanism 904. As can be appreciated by those of ordinary skill within the art, the system 900 can and typically will include other components, in addition to and/or in lieu of those depicted in FIG. 9.

The storage 902 is to store data representing an image as well as data representing one or more dot templates corresponding to an object to be detected within the image. The storage 902 may be or include volatile storage, such as semi-conductor memory, as well as non-volatile storage, such as magnetic media, as can be appreciated by those of ordinary skill within the art. The mechanism 904 is to locate the object within the image using the dot templates, as has been described, such as by performing the method 800 of FIG. 8. The mechanism 904 may be implemented in software, hardware, or a combination of software and hardware, as can be appreciated by those of ordinary skill within the art.

It is noted that, although specific embodiments have been illustrated and described herein, it will be appreciated by those of ordinary skill in the art that any arrangement that is calculated to achieve the same purpose may be substituted for the specific embodiments shown. Other applications and uses of embodiments of the invention, besides those described herein, are amenable to at least some embodiments. This application is intended to cover any adaptations or variations of the present invention. Therefore, it is manifestly intended that this invention be limited only by the claims and equivalents thereof.

What is claimed is:
1. A computer-implemented method comprising:
for each dot template of one or more dot templates corresponding to an object to be detected within an image, where each dot template is defined as a collection of points,
at each position of one or more positions within the image, determining a value of the image at each point of the dot template at the position of the image, such that the dot template is effectively overlaid at the position;

determining a score of the dot template at the position based on the values of the image determined at the points of the dot template, the score determined by dividing a first calculated value by a second calculated value, the first calculated value determined by subtracting a first sum of first maximum functions from a second sum, the second sum including at least a first minimum function, the second calculated value determined by subtracting a second minimum function from a second maximum function, the first maximum functions each being a maximum of a plurality of the points corresponding to potential darker regions of the image, the first minimum function being a minimum of a plurality of the points corresponding to potential lighter regions of the image, the second maximum function being a maximum of a different plurality of the points corresponding to the potential lighter regions of the image, the second minimum function being a minimum of a different plurality of the points corresponding to the potential darker regions of the image; and, where the score of the dot template is greater than a predetermined threshold, concluding that the object is at least potentially located within the image at the position at which the dot template has been effectively overlaid.

2. The method of claim 1, wherein determining the value of the image at each point of the dot template at the position of the image comprises determining the value of a pixel of the image at each point of the dot template at the position of the image.

3. The method of claim 1, wherein determining the value of the image at each point of the dot template at the position of the image comprises determining one or more color values of a pixel of the image at each point of the dot template at the position of the image.

4. The method of claim 1, wherein each dot template is no greater in size than the image, such that each of one or more potential sub-images of the image in relation to which the dot template is capable of being overlaid is one of the positions within the image.

5. The method of claim 1, wherein the object to which the dot templates correspond is a face.

6. The method of claim 5, wherein the collection of points of each of at least one of the dot templates corresponding to the object comprises:
one or more first points corresponding to a potential nose region of the face;
one or more second points corresponding to a potential left cheek region of the face;
one or more third points corresponding to a potential right cheek region of the face;
one or more fourth points corresponding to a potential left eye region of the face;
one or more fifth points corresponding to a potential right eye region of the face; and,
one or more sixth points corresponding to a potential lips/mouth region of the face.

7. The method of claim 5, wherein the collection of points of each of at least one of the dot templates corresponding to the object comprises:

one or more first points corresponding to a potential nose region of the face;
one or more second points corresponding to a potential cheek region of the face;
one or more third points corresponding to a potential eye region of the face;
one or more fourth points corresponding to a potential nostril region of the face; and,
one or more fifth points corresponding to a potential lips/mouse region of the face.

8. The method of claim 5, wherein determining the score of the dot template at the position based on the values of the image determined at the points of the dot template comprises determining the score as $$\frac{\min[I_1, I_2, I_3] + I_4 + I_5 - \max[I_6, I_7] - \max[I_8, I_9] - \max[I_{10}, I_{11}]}{\max[I_1, I_2, I_3, I_4, I_5] - \min[I_6, I_7, I_8, I_9]},$$

where $I_1$, $I_2$, $I_3$, $I_4$, and $I_5$ are values of the image at points corresponding to potential lighter regions of the face, and $I_6$, $I_7$, $I_8$, $I_9$, $I_{10}$, and $I_{11}$ are values of the image at points corresponding to potential darker regions of the face.

9. A non-transitory computer-readable data storage medium storing a computer program executable by a processor to perform a method comprising:
for each dot template of one or more dot templates corresponding to an object to be detected within an image, where each dot template is defined as a collection of points,
at each position of one or more positions within the image,
determining a value of the image at each point of the dot template at the position of the image, such that the dot template is effectively overlaid at the position;
determining a score of the dot template at the position based on the values of the image determined at the points of the dot template, the score determined by dividing a first calculated value by a second calculated value, the first calculated value determined by subtracting a first sum of first maximum functions from a second sum, the second sum including at least a first minimum function, the second calculated value determined by subtracting a second minimum function from a second maximum function, the first maximum functions each being a maximum of a plurality of the points corresponding to potential darker regions of the image, the first minimum function being a minimum of a plurality of the points corresponding to potential lighter regions of the image, the second maximum function being a maximum of a different plurality of the points corresponding to the potential lighter regions of the image, the second minimum function being a minimum of a different plurality of the points corresponding to the potential darker regions of the image; and,
where the score of the dot template is greater than a predetermined threshold, concluding that the object is at least potentially located within the image at the position at which the dot template has been effectively overlaid.

10. A system comprising:

a processor; and a non-transitory computer-readable data storage medium storing a computer program executable by the processor to perform processing comprising:

for each dot template of one or more dot templates corresponding to an object to be detected within an image, where each dot template is defined as a collection of points, at each position of one or more positions within the image, determining a value of the image at each point of the dot template at the position of the image, such that the dot template is effectively overlaid at the position;

determining a score of the dot template at the position based on the values of the image determined at the points of the dot template, the score determined by dividing a first calculated value by a second calculated value, the first calculated value determined by subtracting a first sum of first maximum functions from a second sum, the second sum including at least a first minimum function, the second calculated value determined by subtracting a second minimum function from a second maximum function, the first maximum functions each being a maximum of a plurality of the points corresponding to potential darker regions of the image, the first minimum function being a minimum of a plurality of the points corresponding to potential lighter regions of the image, the second maximum function being a maximum of a different plurality of the points corresponding to the potential lighter regions of the image, the second minimum function being a minimum of a different plurality of the points corresponding to the potential darker regions of the image; and, where the score of the dot template is greater than a predetermined threshold, concluding that the object is at least potentially located within the image at the position at which the dot template has been effectively overlaid.

* * * * *